United States Patent [19]
Saita et al.

[11] Patent Number: 5,950,757
[45] Date of Patent: Sep. 14, 1999

[54] POWER STEERING DEVICES

[75] Inventors: Norihiro Saita; Takayuki Yoshida; Tatsuyoshi Maruyama; Tadaharu Yokota; Toshinori Aihara, all of Kanagawa, Japan

[73] Assignee: Unisia Jecs Corporation, Atsugi, Japan

[21] Appl. No.: 08/974,155

[22] Filed: Nov. 19, 1997

[30]      Foreign Application Priority Data

Nov. 27, 1996 [JP] Japan .................................. 8-330182

[51] Int. Cl.⁶ ...................................................... B62D 5/30
[52] U.S. Cl. .......................... 180/404; 180/442; 60/403
[58] Field of Search .................................. 180/404, 405, 180/406, 407, 417, 421, 422, 442; 60/403, 404, 405, 413, 417, 328; 701/43

[56]              References Cited

U.S. PATENT DOCUMENTS

| | | | |
|---|---|---|---|
| 3,283,165 | 11/1966 | bloch | 60/404 |
| 4,217,968 | 8/1980 | Dezelan | 180/406 |
| 4,303,089 | 12/1981 | Gage et al. | 137/113 |
| 4,476,677 | 10/1984 | Hanshaw | 60/328 |
| 5,209,317 | 5/1993 | Schnelle | 180/417 |
| 5,449,186 | 9/1995 | Gerl et al. | 180/404 |

FOREIGN PATENT DOCUMENTS 56-59474   4/1981   Japan .

*Primary Examiner*—Kevin Hurley
*Attorney, Agent, or Firm*—Foley & Lardner

[57]                ABSTRACT

A power steering device includes a hydraulic pump for discharging working fluid, an actuator for producing a steering assisting force by means of working fluid, a hydraulic passage for connecting the hydraulic pump and the actuator, a check valve arranged to the hydraulic passage to allow flow of working fluid from the hydraulic pump to the actuator and preventing flow thereof in the opposite direction, an accumulator connected to the hydraulic passage downstream of the check valve, a pressure switch for detecting a pressure within the hydraulic passage downstream of the check valve, a control unit for controlling the hydraulic pump in response to the pressure switch, and a display for showing an anomaly of the power steering device. When determining the anomaly of the power steering device, the control unit stops the hydraulic pump and/or makes the display show the anomaly.

9 Claims, 2 Drawing Sheets

POWER STEERING DEVICES

BACKGROUND OF THE INVENTION

The present invention relates to power steering devices for use in motor vehicles, etc.

In order to lighten the steering operation, the motor vehicles use a power steering device for producing a steering assisting force by supplying/discharging working fluid to/from an actuator of a steering unit.

Various improvements have been proposed in the power steering devices. By way of example, JP-U 56-59474 discloses a power steering device comprising a pressure switch arranged in a hydraulic circuit between an actuator including a control valve and a power cylinder and a hydraulic pump driven by a drive source so as to detect the pressure within the hydraulic circuit and an accumulator. When the pressure within the hydraulic circuit is less than a predetermined value, the hydraulic pump is driven by the drive source, and when it is more than the predetermined value, the operation of the hydraulic pump by the drive source is stopped.

This improved power steering device can avoid an inconvenience due to insufficient discharge of working fluid produced upon quick steering, etc. by a rise characteristic of the hydraulic pump by previously accumulating working fluid in the accumulator. This device can also achieve energy saving by driving the hydraulic pump discontinuously, i.e. only when the pressure switch detects a pressure drop within the hydraulic circuit.

With the known power steering device, however, the hydraulic pump is driven when the pressure within the hydraulic circuit is less than the predetermined value, so that when a hydraulic system produces an inconvenience such as leakage of working fluid from a hydraulic pipe, the hydraulic pump can be driven continuously to consume power uselessly. The same problem can arise when the pressure switch for detecting the pressure within the hydraulic circuit produces an inconvenience.

Regarding the problem that the hydraulic pump is driven continuously to consume power uselessly, it is noted that an anomaly of the hydraulic system can be determined by monitoring the pressure within the hydraulic circuit, and an anomaly of an electric system can be determined in accordance with a signal of the pressure switch itself for monitoring the pressure within the hydraulic circuit. This means that both anomalies can be determined in accordance with a signal of the pressure switch.

It is, therefore, an object of the present invention to provide power steering devices which can minimize useless power consumption by early detection of an anomaly of the hydraulic or electric system thereof.

SUMMARY OF THE INVENTION

One aspect of the present invention lies in providing a power steering device, comprising:
- a pump arranged to discharge a working fluid;
- an actuator arranged to produce a steering assisting force by means of said working fluid;
- a passage arranged to connect said pump and said actuator;
- a check valve arranged with said passage, said check valve allowing flow of said working fluid from said pump to said actuator and preventing flow thereof in the opposite direction;
- an accumulator connected to said passage downstream of said check valve;
- a pressure switch arranged to detect a pressure within said passage downstream of said check valve and generating a pressure signal indicative of said pressure detected;
- a control unit connected to said pressure switch, said control unit controlling said pump in response to said pressure signal, said control unit detecting an anomaly of the power steering device in response to said pressure signal; and
- a display connected to said control unit, said display showing said anomaly of the power steering device,
- wherein when determining said anomaly of the power steering device, said control unit carries out at least one of stopping of said pump and showing of said anomaly on said display.

Another aspect of the present invention lies in providing a power steering device, comprising:
- a pump arranged to discharge a working fluid;
- an actuator arranged to produce a steering assisting force by means of said working fluid;
- a passage arranged to connect said pump and said actuator;
- a check valve arranged to said passage, said check valve allowing flow of said working fluid from said pump to said actuator and preventing flow thereof in the opposite direction;
- an accumulator connected to said passage downstream of said check valve;
- means for detecting a pressure within said passage downstream of said check valve and generating a pressure signal indicative of said pressure detected;
- a control unit connected to said pressure detecting means, said control unit controlling said pump in response to said pressure signal, said control unit including means for detecting an anomaly of the power steering device in response to said pressure signal; and
- a display connected to said control unit, said display showing said anomaly of the power steering device,
- wherein when said anomaly detecting means determine said anomaly of the power steering device, said control unit carries out at least one of stopping of said pump and showing of said anomaly on said display.

DETAILED DESCRIPTION OF THE INVENTION

Figure 1:
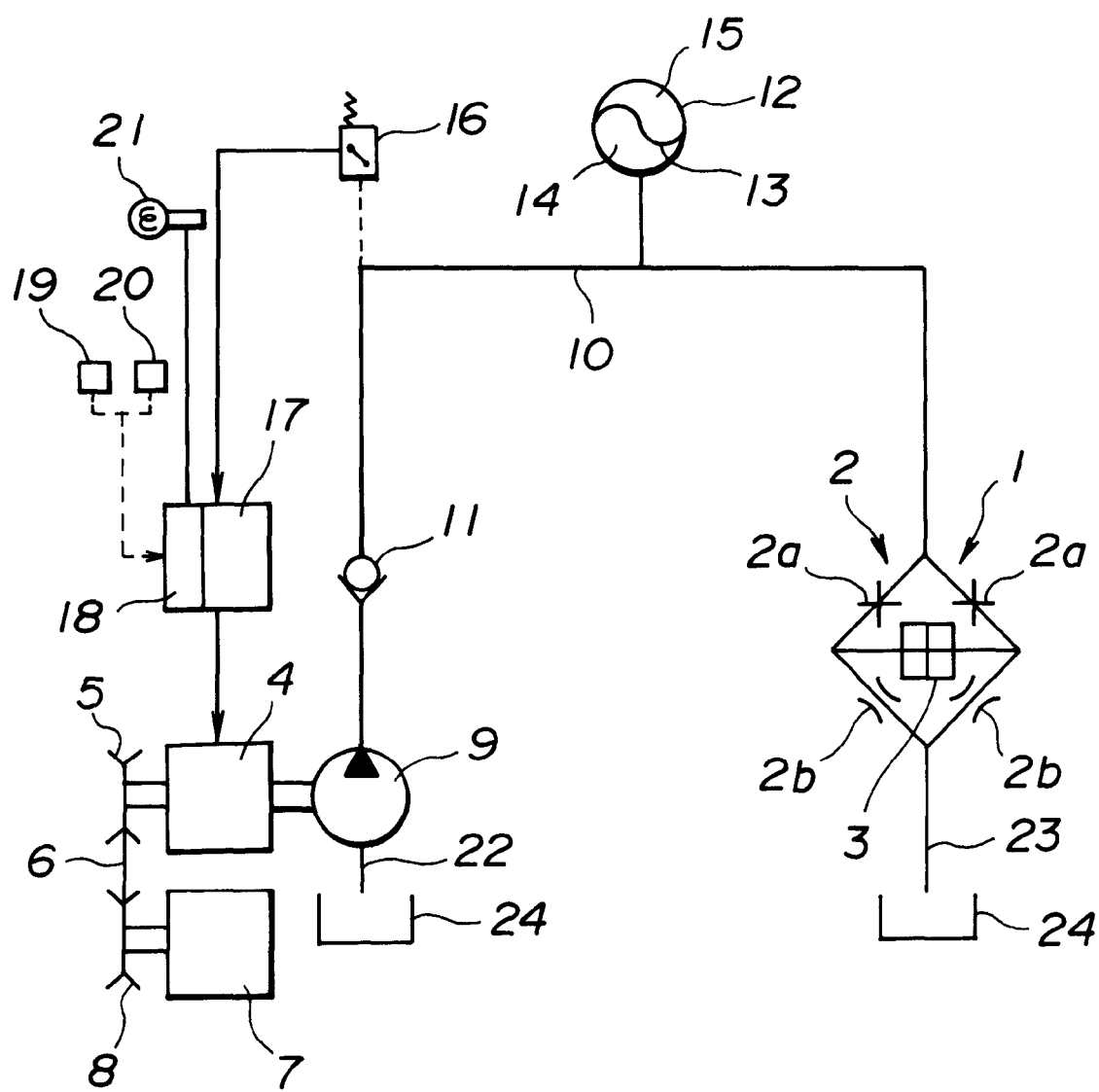
FIG. 1 is a block diagram showing a first embodiment of a power steering device according to the present invention.
Figure 2:
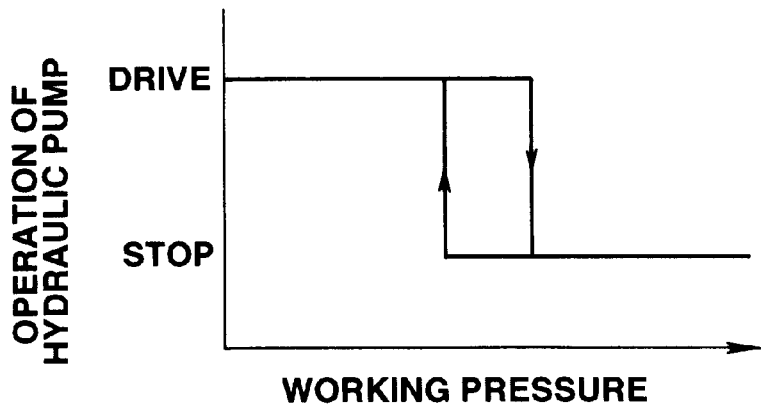
FIG. 2 is a graph showing the operation of a hydraulic pump.

Referring to FIGS. 1-2, a power steering device comprises an actuator 1 including a center-closed control valve 2 and a power cylinder 3. The control valve 2 includes a normally-closed valve 2a arranged on the side of a working-fluid passage 10, and a normally-open valve 2b arranged on the side of a drain passage 23.

An electromagnetic clutch 4 as driving means includes a pulley 5 which is connected to a pulley 8 of an internal combustion engine 7 through a belt 6, and is always driven by the engine 7.

A hydraulic pump 9 is driven by the electromagnetic clutch 4 when it is connected thereto.

A working-fluid passage 10 leads working fluid discharged from the hydraulic pump 9 to the actuator 1. A check valve 11 is arranged in the middle of the working-fluid passage 10 to allow flow of working fluid from the hydraulic pump 9 to the actuator 1, and prevent flow thereof in the opposite direction.

An accumulator 12 is connected to the working fluid passage 10 downstream of the check valve 11. The inside of the accumulator 12 is partitioned by a flexible membrane 13 into a working-fluid chamber 14 and a gas chamber 15 which communicate with the working-fluid passage 10. The pressure of pressurized gas within the gas chamber 15 enables maintaining of the pressure within the working-fluid passage 10 at a predetermined value.

A pressure switch 16 as pressure detecting means can detect the pressure within the working-fluid passage 10 downward of the check valve 11.

A control unit 17 inputs a detection signal of the pressure switch 16, and controls the electromagnetic clutch 4 in accordance therewith to drive and stop the hydraulic pump 9.

Anomaly detecting means 18, which are included in the control unit 17, can determine an anomaly of the power steering device in accordance with the detection signal of the pressure switch 16. The anomaly detecting means 18 input signals of a vehicular-speed sensor 19 and a steering-angle sensor 20.

A display 21 shows an anomaly when the anomaly detecting means 18 determine that the power steering device is abnormal. Specifically, the display 2 may be a warning lamp which is turned on when the anomaly detecting means 18 determine that the power steering device is abnormal.

In FIG. 1, 22 designates an intake passage, 23 designates a drain passage, and 24 designates a reservoir tank for working fluid.

With such a structure, the electromagnetic clutch 4 is controlled by the control unit 17 in accordance with the pressure within the working-fluid passage 10 downstream of the check valve 11. Specifically, when the pressure within the working-fluid passage 10 is lower than the predetermined value, the electromagnetic clutch 4 is controlled in the engaged state to drive the hydraulic pump 9, and when the pressure is higher than the predetermined value, it is controlled in the disengaged state.

The pulley 5 of the electromagnetic clutch 4 is always driven by the internal combustion engine 7. With engagement of the electromagnetic clutch 4, the hydraulic pump 9 is driven through the clutch 4.

When operated, the hydraulic pump 9 inhales working fluid in the reservoir tank 24 through the intake passage 22, and discharges it to the working-fluid passage 10. Working fluid discharged to the working-fluid passage 10 is led to the actuator 1 through the check valve 11.

Upon operation of the actuator 1 where a steering assisting force is needed, working fluid led to the actuator 1 is used to produce the steering assisting force. That is, as described above, the control valve 2 of the actuator 1 includes the normally-closed valve 2a disposed upstream or on the side of the working-fluid passage 10, and the normally-open valve 2b disposed downstream or on the side of the drain passage 23. The control valve 2 is selectively opened and closed in accordance with the steered state to selectively drive the power cylinder 3, operating the actuator 1. Thus, working fluid led to the actuator 1 is used to produce the steering assisting force.

If, with working fluid discharged from the hydraulic pump 9, the steering assisting force becomes unnecessary, and the actuator 1 passes from the operating state to the non-operating state, the quantity of working fluid used in the actuator 1 is gradually decreased to be zero in the end. And working fluid discharged from the hydraulic pump 9 is supplied/accumulated to/in the accumulator 12 through the check valve 11 and the working-fluid passage 10 downstream thereof. Therefore, the accumulator 12 maintains the pressure within the working-fluid passage 10 downstream of the check valve 11 upon non-operation of the actuator 1.

With working fluid continuously being accumulated in the accumulator 12, the pressure within the working-fluid passage 10 downstream of the check valve 11 reaches the predetermined value, which is detected by the pressure switch 16, a detection signal of which is output to the control unit 17. Referring to FIG. 2, in accordance with the detection signal of the pressure switch 16, the control unit 17 controls or disengages the electromagnetic clutch 4 to stop the operation of the hydraulic pump 9.

When the operation of the hydraulic pump 9 is stopped, working fluid is not supplied from the hydraulic pump 9 to the working-fluid passage 10 downstream of the check valve 11. However, the working-fluid passage 10 downstream of the check valve 11, which does not communicate with the working-fluid passage 10 upstream thereof by the check valve 11, receives the pressure resulting from the accumulator 12 to have the pressure maintained at a predetermined value as described above. As a consequence, upon quick steering, etc., working fluid accumulated in the working-fluid passage 10 downstream of the check valve 11 and the accumulator 12 is immediately supplied to the actuator 1, obtaining smooth steering assisting action.

With energy accumulated in the accumulator 12 being consumed by the operation of the actuator 1, the pressure within the working-fluid passage 10 downstream of the check valve 11 falls below the predetermined value, which is detected by the pressure switch 16, a detection signal of which is output to the control unit 17. Referring to FIG. 2, in accordance with the detection signal of the pressure switch 16, the control unit 17 controls or engages the electromagnetic clutch 4 to drive the hydraulic pump 9 again.

With re-driving of the hydraulic pump 9, working fluid discharged therefrom is supplied to the actuator 1 and the accumulator 12, obtaining steering assisting action. After this, the above operation is repeatedly carried out.

In the first embodiment, the anomaly detecting means 18 are arranged to determine an anomaly of the power steering device in accordance with the detection signal of the pressure switch 16.

The anomaly detecting means 18 can determine that the power steering device is abnormal when the pressure switch 16 outputs continuously during a predetermined period of time a detection signal indicative that the pressure is lower than the predetermined value. In that case, the anomaly detecting means 18 determine an anomaly of the power steering device when working fluid is leaked from the working-fluid passage 10 downstream of the check valve 11, and when the pressure switch 16 breaks down.

Further, the anomaly detecting means 18 can determine that the power steering device is abnormal when the number of times per unit time that the detection signal of the pressure switch 16 varies across the predetermined value is more than a predetermined number. In that case, in view of the fact that the pressure within the working-fluid passage 10 varies repeatedly frequently between the state lower than the predetermined value and the state higher than the predetermined value, the anomaly detecting means 18 determine an anomaly of the power steering device when working fluid is leaked from the working-fluid passage 10 downstream of the check valve 11, and when the accumulation capacity of the accumulator 12 is lowered due to leakage of pressurized gas within the accumulator 12.

Still further, the anomaly detecting means 18 can determine that the power steering device is abnormal when inputting from the vehicular-speed sensor 19 a signal indicative that the vehicular speed is not zero, i.e. a signal indicative that the vehicle is cruising, and when the number of times per unit time that the detection signal of the pressure switch 16 varies across the predetermined value is less than the predetermined number. In that case, in view of the fact that in the cruising state of the vehicle, the pressure switch 16 continuously outputs a detection signal indicative that the pressure is higher than the predetermined value, the anomaly detecting means 18 determine an anomaly of the power steering device when the pressure switch 16 breaks down, and when the hydraulic pump 9 breaks down.

Still further, the anomaly detecting means 18 can determine that the power steering device is abnormal when inputting from the vehicular-speed sensor 19 a signal indicative that the vehicular speed is not zero, and when inputting continuously during a predetermined period of time from the pressure switch 16 the detection signal indicative that the pressure is higher than the predetermined value. In that case, in view of the fact that in the cruising state of the vehicle, the pressure switch 16 continuously outputs the detection signal indicative that the pressure is higher than the predetermined value, the anomaly detecting means 18 determine an anomaly of the power steering device when the pressure switch 16 breaks down, and when the hydraulic pump 9 breaks down.

Furthermore, the anomaly detecting means 18 can determine that the power steering device is abnormal when, with a predetermined quantity of the steering angle, the number of times per unit time that the detection signal of the pressure switch 16 varies across the predetermined value is more or less than the predetermined number. In that case, in view of the fact that with the predetermined quantity of the steering angle obtained from the steering-angle sensor 20, i.e. by integrating the absolute value of the steering angle, the pressure within the working-fluid passage 10 varies repeatedly frequently between the state lower than the predetermined value and the state higher than the predetermined value, or the number of times of the repetition of such pressure variation is small, the anomaly detecting means 18 determine an anomaly of the power steering device: in case of larger number of times of the repetition, when working fluid is leaked from the working-fluid passage 10, and when the accumulation capacity of the accumulator 12 is lowered; and in case of smaller number of times of the repetition, when the pressure switch 16 breaks down, and when the hydraulic pump 9 breaks down.

When the anomaly detecting means 18 determine an anomaly of the power steering device in accordance with the detection signal of the pressure switch 16, the control unit 17 controls the electromagnetic clutch 4 or cuts off power thereto to stop the hydraulic pump 9 or make the display 21 show the anomaly, or to stop the hydraulic pump 9 and make the display 21 show the anomaly. When the display 21 shows the anomaly, a driver or passenger who sees this operates a switch, etc. not shown, to stop the operation of the hydraulic pump 9.

Therefore, the anomaly of the power steering device or the hydraulic or electric system thereof can be detected in an early stage, obtaining the power steering device which can minimize useless power consumption.

Figure 3:
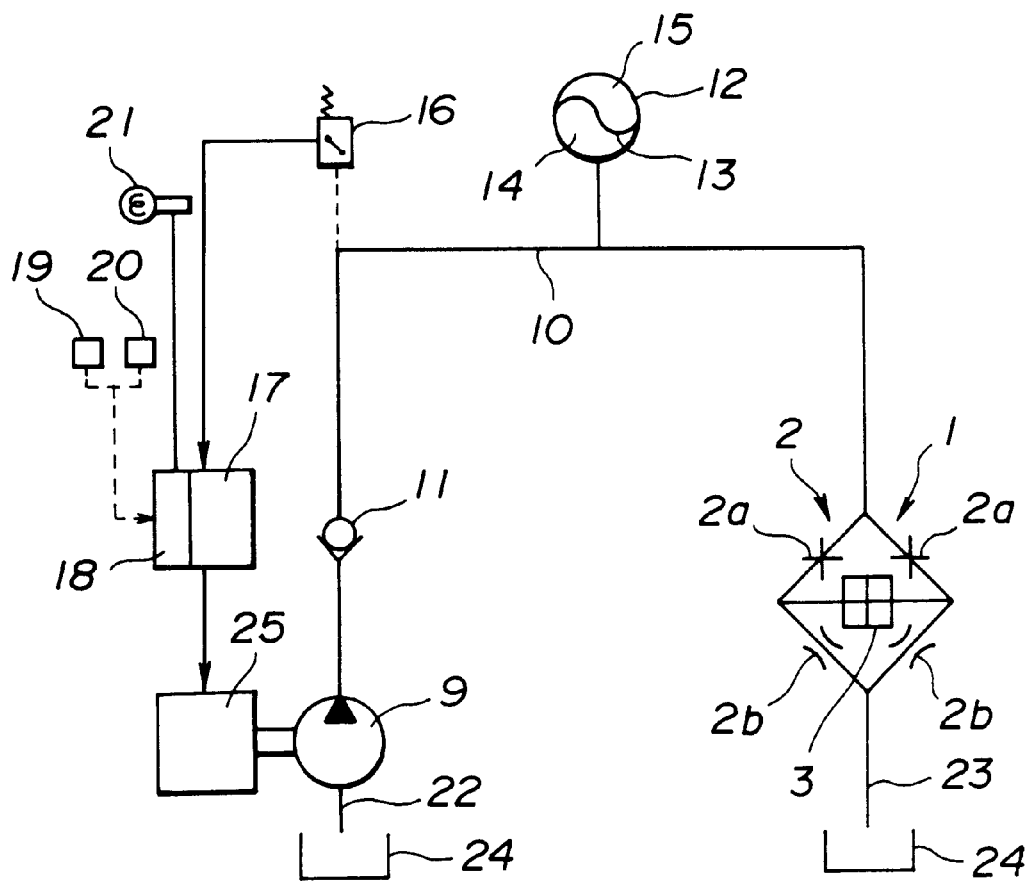
FIG. 3 is a view similar to FIG. 1, showing a second embodiment of the present invention.

FIG. 3 shows a second embodiment of the present invention which is substantially the same as the first embodiment except that an electric motor 25 is used as driving means in place of the electromagnetic clutch 7.

With such a structure, the control unit 17 controls the electric motor 25 to drive and stop the hydraulic pump 9. Therefore, the second embodiment produces the same operation and effect as those of the first embodiment.

Having described the present invention with regard to the preferred embodiments, it is noted that the present invention is not limited thereto, and various changes and modifications can be made without departing from the scope of the present invention. By way of example, as seen from the foregoing, the vehicular-speed sensor 19 and the steering-angle sensor 20 can be eliminated.

What is claimed is:

1. A power steering device, comprising:

a pump arranged to discharge a working fluid;

an actuator arranged to produce a steering assisting force by means of said working fluid;

a passage arranged to connect said pump and said actuator;

a check valve arranged with said passage, said check valve allowing flow of said working fluid from said pump to said actuator and preventing flow thereof in the opposite direction;

an accumulator connected to said passage downstream of said check valve;

a pressure switch arranged to detect a pressure within said passage downstream of said check valve and generating a pressure signal indicative of said pressure detected;

a control unit connected to said pressure switch, said control unit controlling said pump in response to said pressure signal, said control unit detecting an anomaly of the power steering device in response to said pressure signal; and a display connected to said control unit, said display showing said anomaly of the power steering device, wherein when determining said anomaly of the power steering device, said control unit carries out at least one of stopping of said pump and showing of said anomaly on said display.

2. A power steering device as claimed in claim 1, wherein said control unit determines said anomaly of the power steering device when said pressure signal is indicative that said pressure is lower than a predetermined value and is output continuously during a predetermined period of time.

3. A power steering device as claimed in claim 1, wherein said control unit determines said anomaly of the power steering device when the number of times per unit time that said pressure signal varies across a predetermined value is more than a predetermined number.

4. A power steering device as claimed in claim 1, further comprising a vehicular-speed sensor connected to said control unit.

5. A power steering device as claimed in claim 4, wherein said control unit inputs a signal indicative of a vehicular speed from said vehicular-speed sensor, and determines said anomaly of the power steering device when said vehicular speed is not zero, and when the number of times per unit time that said pressure signal varies across a predetermined value is less than a predetermined number.

6. A power steering device as claimed in claim 4, wherein said control unit inputs a signal indicative of a vehicular speed from said vehicular-speed sensor, and determines said anomaly of the power steering device when said vehicular speed is not zero, and when said pressure signal is indicative that said pressure is higher than a predetermined value and is output continuously during a predetermined period of time.

7. A power steering device as claimed in claim 1, further comprising a steering-angle sensor connected to said control unit.

8. A power steering device as claimed in claim 7, wherein said control unit inputs a signal indicative of a steering angle from said steering-angle sensor, and determines said anomaly of the power steering device when, with a predetermined quantity of said steering angle, the number of times per unit time that said pressure signal varies across a predetermined value is not equal to a predetermined number.

9. A power steering device, comprising:

a pump arranged to discharge a working fluid;

an actuator arranged to produce a steering assisting force by means of said working fluid;

a passage arranged to connect said pump and said actuator;

a check valve arranged to said passage, said check valve allowing flow of said working fluid from said pump to said actuator and preventing flow thereof in the opposite direction;

an accumulator connected to said passage downstream of said check valve;

means for detecting a pressure within said passage downstream of said check valve and generating a pressure signal indicative of said pressure detected;

a control unit connected to said pressure detecting means, said control unit controlling said pump in response to said pressure signal, said control unit including means for detecting an anomaly of the power steering device in response to said pressure signal; and a display connected to said control unit, said display showing said anomaly of the power steering device, wherein when said anomaly detecting means determines said anomaly of the power steering device, said control unit carries out at least one of stopping of said pump and showing of said anomaly on said display.

\* \* \* \* \*